UNITED STATES PATENT OFFICE.

FRIEDRICH STOLZ AND FRANZ FLAECHER, OF HÖCHST-ON-THE-MAIN, GERMANY, ASSIGNORS, BY MESNE ASSIGNMENTS, TO H. A. METZ & CO., A COMPANY OF NEW YORK.

ORTHO-DIOXYPHENYLETHANOLMETHYLAMIN AND PROCESS OF MAKING SAME.

No. 930,703.   Specification of Letters Patent.   Patented Aug. 10, 1909.

Application filed September 7, 1906. Serial No. 333,623. (Specimens.)

*To all whom it may concern:*

Be it known that we, FRIEDRICH STOLZ, Ph. D., and FRANZ FLAECHER, Ph. D., chemists, citizens of the Empire of Germany, and residents of Höchst-on-the-Main, in said Empire of Germany, have invented certain new and useful Improvements in Making Ortho - Dioxyphenylethanolmethylamin, of which the following is a description.

Our invention relates to certain new and useful improvements in astringent or hemostatic products, as will be hereinafter more fully described.

It is well known that the suprarenal glands possess hemostatic, blood-pressure-raising attributes, that these glands have been treated in various ways, and the active principle thereof utilized for a considerable period. The products obtained, however, have been more or less unsatisfactory by reason of their lack of purity and instability, and our invention consists in a new, synthetic product which possesses all of the valuable astringent and blood-pressure-raising properties, and one which is stable, uniform, and reliable.

We have found that the alcohol bases produced by the reduction of amino, or alkyl-amino-aceto-pyrocatechol may be obtained in a substantially pure state by extracting the acid solution resulting by reduction from the aforesaid keto bases, with a solvent, such, for instance, as ether or ethyl acetate, in order to eliminate any by-products, and by then adding ammonia to the concentrated aqueous solution. The separated base may then be transformed into its oxalate which crystallizes from alcohol whence it may be regenerated.

The process is, for instance, as follows: Ten parts by weight of the hydrochlorid of methylamino - aceto - pyrocatechol are dissolved in 10 times the quantity of water and reduced by introducing 120 parts by weight of sodium amalgam while cooling. The solution is kept during the operation feebly acid by dropping into it diluted hydrochloric acid. The aqueous solution thus obtained is repeatedly shaken out with ether and may hereafter be concentrated by evaporating in a vacuum; the separated sodium chlorid may be filtered and the solution again extracted with ether. On adding ammonia until the solution reacts alkaline to curcuma, the dioxyphenylethanolmethylamin is precipitated as a crystalline powder. This base may be further transformed into its oxalate which crystallizes from alcohol whence the base may be regenerated. The ortho - dioxyphenylethanolmethylamin thus obtained has the formula

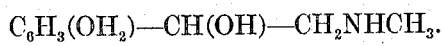
$$C_6H_3(OH_2)\text{---}CH(OH)\text{---}CH_2NHCH_3.$$

It forms a white crystalline powder of the melting point of 208 degrees C. (not corrected). It is soluble with great difficulty in water, alcohol and ether. When dry it is stable, contrary to the product obtained by Dakin (*Proceedings of the Chem. Soc.*, 1905, p. 154) from methylamin-aceto-pyrocatechol. The hydrochlorid of the base is very easily soluble, but the oxalate crystallizes from alcohol. The aqueous solution of the salts yields a green color with ferric chlorid. No decomposition at all occurs on keeping the pure compound obtained according to this process and the physiological efficacy is preserved for a year and more. The product is used as an astringent or hemostatic, and as an addition to local anesthetics, preferably in the proportion of 1–20 drops of a solution of 1:1000 of the hydrochlorid of the compound. It may be applied subcutaneously or internally.

Having now described our invention, what we claim is:—

1. As a new product, a substance derived from pyrocatechol and possessing the herein-described astringent or hemostatic properties, consisting of a substantially white crystalline powder having a melting point of substantially 208 degrees C. and being difficultly soluble in water, alcohol or ether, stable when in a dry state, and optically inactive.

2. As a new product, the ortho-dioxyphenylethanolmethylamin in a substantially pure state, consisting of a white crystalline powder having a melting point of 208 degrees C., being difficultly soluble in water, alcohol or ether, stable when in a dry state, and optically inactive.

3. The herein-described process consisting in reducing by means of an appropriate reducing reagent, a slightly acid, aqueous solution of the hydrochlorid of methyl-amino-aceto - pyrocatechol, washing the said solution with an immiscible, volatile fluid for the removal of impurities, concentrating in a vacuum, removing sodium chlorid, and precipitating the salt by means of appropriate reagents.

4. The herein-described process which consists in dissolving the hydrochlorid of methyl-amino-aceto-pyrocatechol in slightly acidulated water, reducing said hydrochlorid by introducing sodium amalgam into the solution, shaking out the solution with ether to extract by-products, concentrating the solution, filtering the same to remove sodium chlorid, again extracting the solution with ether, and adding ammonia to the solution to precipitate ortho-dioxyphenylethanol-methylamin.

In testimony, that we claim the foregoing as our invention, we have signed our names in presence of two subscribing witnesses.

FRIEDRICH STOLZ.
FRANZ FLAECHER.

Witnesses:
JEAN GRUND,
CARL GRUND.